United States Patent
Rankin

(10) Patent No.: US 7,526,974 B2
(45) Date of Patent: May 5, 2009

(54) AUTOMOTIVE DRIVETRAIN HAVING DEFLECTION COMPENSATION

(76) Inventor: Charles G. Rankin, P.O. Box 716, Smithville, MO (US) 64089

( * ) Notice: Subject to any disclaimer, the term of this patent is extended or adjusted under 35 U.S.C. 154(b) by 0 days.

(21) Appl. No.: 11/932,333

(22) Filed: Oct. 31, 2007

(65) Prior Publication Data
US 2008/0076584 A1 Mar. 27, 2008

Related U.S. Application Data

(62) Division of application No. 11/130,913, filed on May 17, 2005.

(60) Provisional application No. 60/575,344, filed on May 28, 2004.

(51) Int. Cl.
*F16H 3/08* (2006.01)
*B25G 3/28* (2006.01)

(52) U.S. Cl. .................. 74/325; 74/329; 703/359.1

(58) Field of Classification Search .............. 74/325, 74/329, 331; 403/359.1, 359.6
See application file for complete search history.

(56) References Cited

U.S. PATENT DOCUMENTS

| | | | |
|---|---|---|---|
| 2,125,433 A | 8/1938 | Dunkelow | |
| 3,105,395 A | 10/1963 | Perkins | |
| 3,478,887 A | 11/1969 | Ohrberg | |
| 3,624,771 A | 11/1971 | McNamara | |
| 3,680,675 A | 8/1972 | Livezey | |
| 4,132,090 A | 1/1979 | McDermott | |
| 4,254,668 A | 3/1981 | Kessinger et al. | |
| 5,228,846 A | 7/1993 | Lammers et al. | |
| 7,383,748 B2 * | 6/2008 | Rankin | ........................ 74/325 |

OTHER PUBLICATIONS

"Machinery's Handbook", *Involute Splines*, Erik Orberg, Franklin D. Jones and Holbrook L. Horton, Industrial Press Inc., Twenty-First Edition, Fifth Printing, 1982, pp. 1010-1015.
"Circle Track & Racing Technology" website, *Clutch Basics 101 Clutch Installation Guidelines*, Tom Rounds, Mar. 15, 2004, 5 pages.
"How Things Work", vol. II, *Gearbox (Transmission)*, Illustrations Researched by Roger Jean Segalat, © Bibliographisches Institut and George Allen & Unwin Ltd., English Edition, undated but conceded by applicant to be prior art, 3 pages.
"How Things Work", vol. III, *Operating an Automobile*, Illustrations Researched by Roger jean Segalat, © Bibliographisches Institut and George Allen & Unwin Ltd., English Edition, undated but conceded by applicant to be prior art, 6 pages.

* cited by examiner

*Primary Examiner*—Roger Pang
(74) *Attorney, Agent, or Firm*—Hovey Williams LLP

(57) ABSTRACT

A deflection compensation system for automobile drivetrain components is provided, wherein a shaft is able to continue in driving relationship to another shaft or coupler in driven relationship when their respective axes of rotation are misaligned. At least one of the shaft and the coupler is preferably supported independently of the other and provided with crown involute splines, whereby one of the shaft and coupler when out of relative alignment, continues to drive the other without the necessity of adding additional moving parts to the drivetrain component.

7 Claims, 7 Drawing Sheets

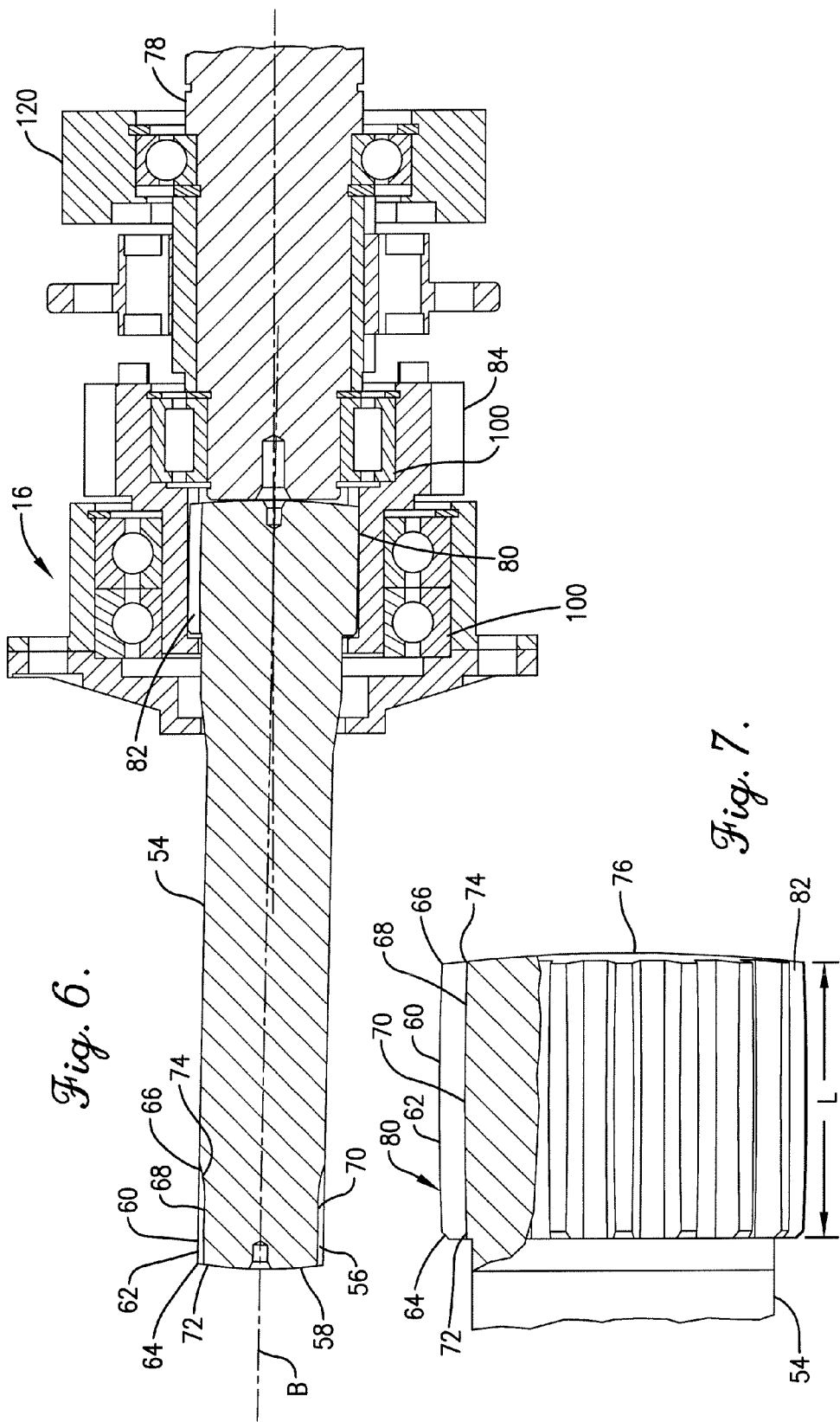

AUTOMOTIVE DRIVETRAIN HAVING DEFLECTION COMPENSATION

RELATED APPLICATIONS

This application is a divisional of application Ser. No. 11/130,913, filed May 17, 2005, entitled AUTOMOTIVE DRIVETRAIN HAVING DEFLECTION COMPENSATION, which is a non-provisional application of Provisional Application Ser. No. 60/575,344, filed May 28, 2004, and entitled GEARBOX HAVING DEFLECTION COMPENSATION, all of which are hereby incorporated by reference herein.

BACKGROUND OF THE INVENTION

1. Field of the Invention

This invention involves the drivetrain of an automobile which compensates for movement and misalignment between driving and driven components thereof. Drivetrain components such as clutches, gearboxes or transmissions, and axle drive units are provided with deflection compensation which enables the axis of an input shaft or gear to be angled relative to the axis of the driven shaft or gearing nominally aligned with the input shaft without transmitting substantial deflection loading. The deflection compensation is preferably provided by employing crown involute splines on one of the driving and driven member and mounting the driving and/or driven component so that the centerline of rotation is determined independently of the other component, most preferably by substituting parts without adding additional moving parts to a conventional drivetrain component.

2. Description of the Prior Art

Automotive drivetrain systems typically involve a prime mover such as a motor (which may be of a variety of types, such as a combustion engine, electric or pneumatically powered motor), and may include in various applications a clutch, a gearbox or transmission such as an automatic transmission having a fluid coupling, and a driveshaft and an axle drive unit. Such drivetrain components typically include an input, such as a shaft or gear, and an output, for example a shaft or gear, whereby the rotating speeds of the input shaft and the output shaft may be varied between a direct drive relationship and one or several relatively different speeds through gear reduction. Power generated by the motor is operatively transmitted to the gearbox or transmission, and clutches or flywheels may be located intermediate the motor and the gearbox as is well known in the art. In many automotive applications, the gearbox is connected to the driveshaft which in turn rotatably drives a differential or other axle drive unit for transmitting the power to the axles and wheels of the automobile. Such drivetrains are often of substantial length, such as 2-3 meters. In addition, in many applications the motor and gearbox are of significant mass, and though the motor, gearbox and differential are connected to a frame, such as an automobile chassis or body, relative movement between these components occurs during operation. In addition, the motor, clutch, gearbox or transmission, and/or axle drive unit and axles may not be installed in precision alignment.

As a result of initial alignment variations, movement during operation, and other factors, the inputs and outputs, such as shafts, couplings, gears or other driving and driven members of the drivetrain, may be subjected to different lateral loading where their respective rotational axes are not in linear alignment. This may occur between the engine and clutch, the engine and transmission, the clutch and the gearbox or transmission, or between the axle and the axle drive unit even where the input shaft and output shaft are each journalled by bearings designed for maintaining alignment of the input shaft and output shaft. Two principal consequences of not having the input shaft and output shaft in their designed colinear alignment are typically experienced: one is excessive wear on one of the input and output shaft and their connecting gears and bearings; the other is a loss of power and efficiency in the power transmission. The loss of power and efficiency results from the necessity of a shaft to bend during rotation when its axis of rotation moves or is installed out of alignment. In order for the shaft to turn, some bending must occur, and this bending of high strength steel shafts, even when the bending is visually imperceptible, consumes energy and there is a loss of power delivered from the prime mover to the wheels.

SUMMARY OF THE INVENTION

The present invention largely overcomes these problems and provides significant advantages over the prior art. That is to say, the drivetrain components of the present invention may be operatively coupled together in restricted spaces without loss of power or requiring additional energy expenditure to overcome energy losses incurred in bending shafts or the like to overcome misalignment of the axis of rotation of two interconnected drivetrain components. Unlike the use of universal joints typically employed to transmit rotational forces between a gearbox and a driveshaft, for example, the drivetrain components of the present invention may operate in restricted areas, and permit limited translation as well as variation between the angles of rotation of the driven components. Furthermore, in the present invention, the driving and driven components can be located independently, without the driving and driven members connected in such a way that bending of a shaft is a necessary consequence of rotational coupling.

BRIEF DESCRIPTION OF THE DRAWINGS

FIG. 6 is a fragmentary vertical cross-sectional view similar to FIG. 5, showing the input shaft axis of rotation angled relative to the axis of rotation of the gearbox main shaft;

FIG. 7 is an enlarged fragmentary view of the use of crown involute splines on the shafts of the present invention.

DESCRIPTION OF THE PREFERRED EMBODIMENT

Figure 1:
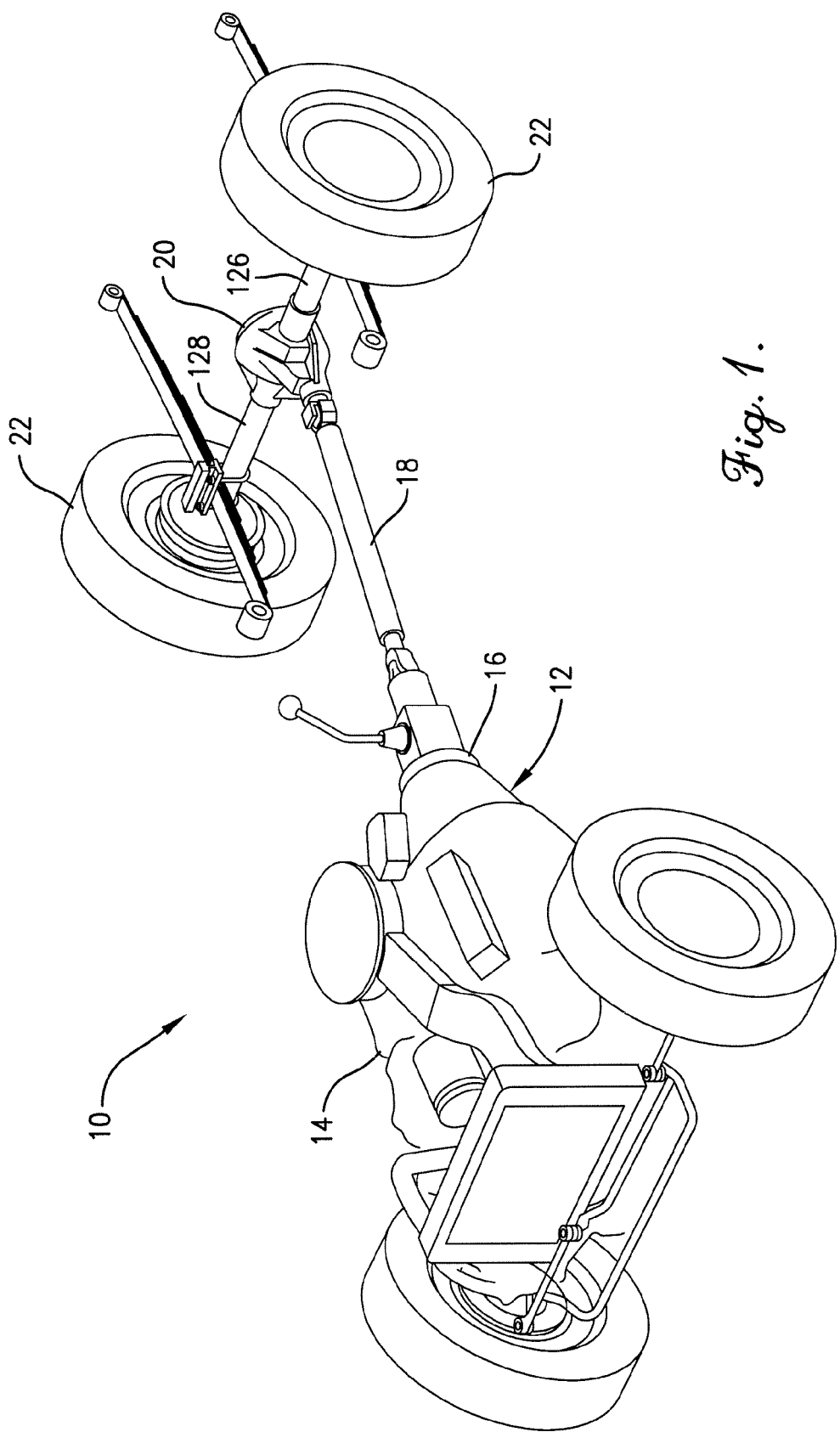
FIG. 1 is a perspective view of an automobile with the body and chassis components removed for clarity to show the drivetrain including the engine, gearbox, axle drive unit and wheels.

Referring now to the drawings, an automobile 10 broadly includes a drivetrain 12. The drivetrain 12 includes an engine 14, a gearbox 16, a driveshaft 18, an axle drive unit 20, and wheels 22 which are driven to move the automobile 10. While a manual gearbox utilizing a manual shift lever for selecting the desired gear during operation is illustrated in the drawings, as used herein, the term gearbox is intended to include both manually actuated gearboxes as well as automatic transmissions such as those employing fluid couplings and torque converters as are well known to those skilled in the art. The engine 14 as used herein may include not only internal combustion or external combustion engines, but also electric or other motors which function as the prime mover for the automobile 10.

Figure 2:
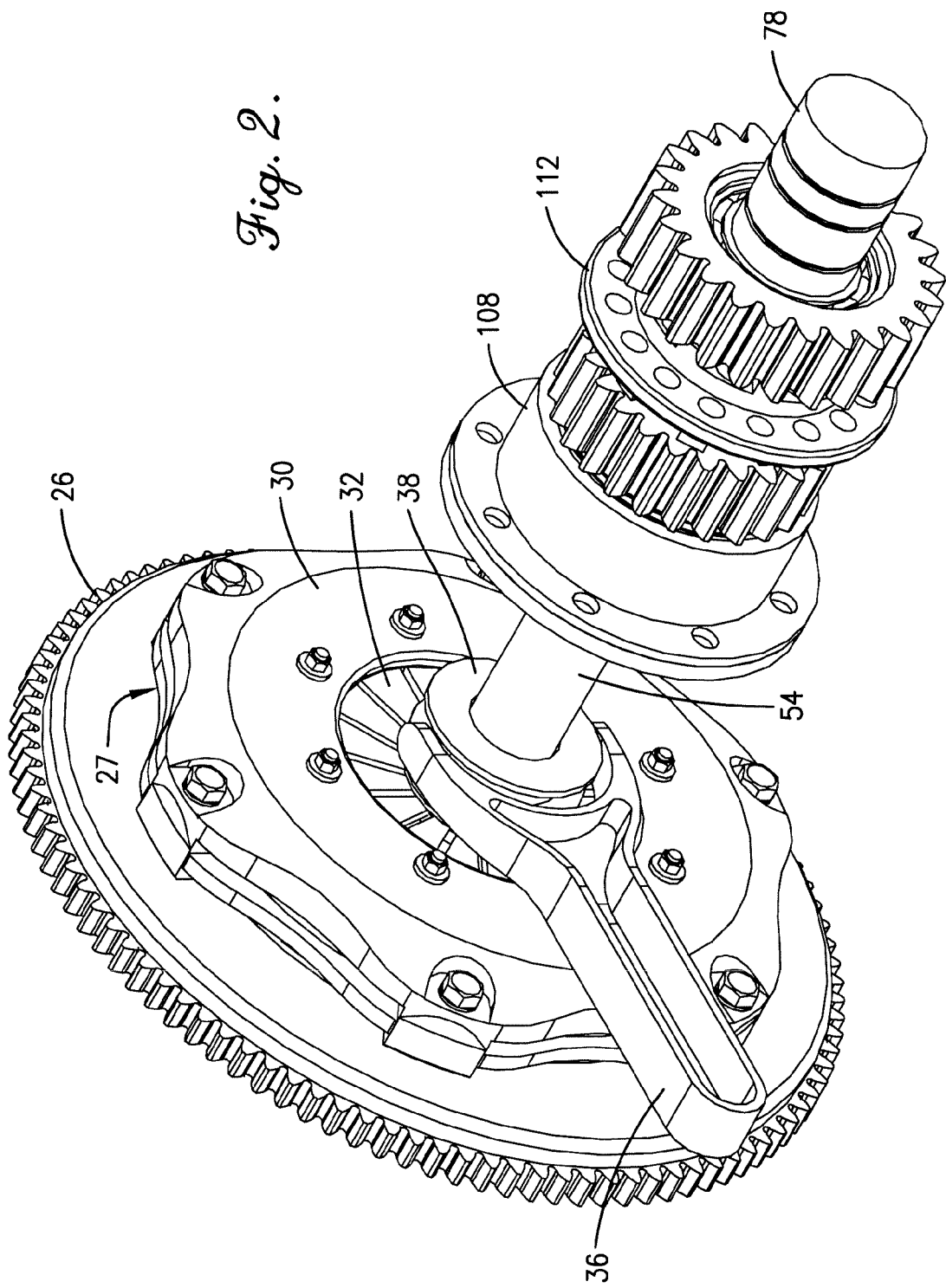
FIG. 2 is a perspective view of a clutch assembly of an automobile and the input shaft of the gearbox.
Figure 3:
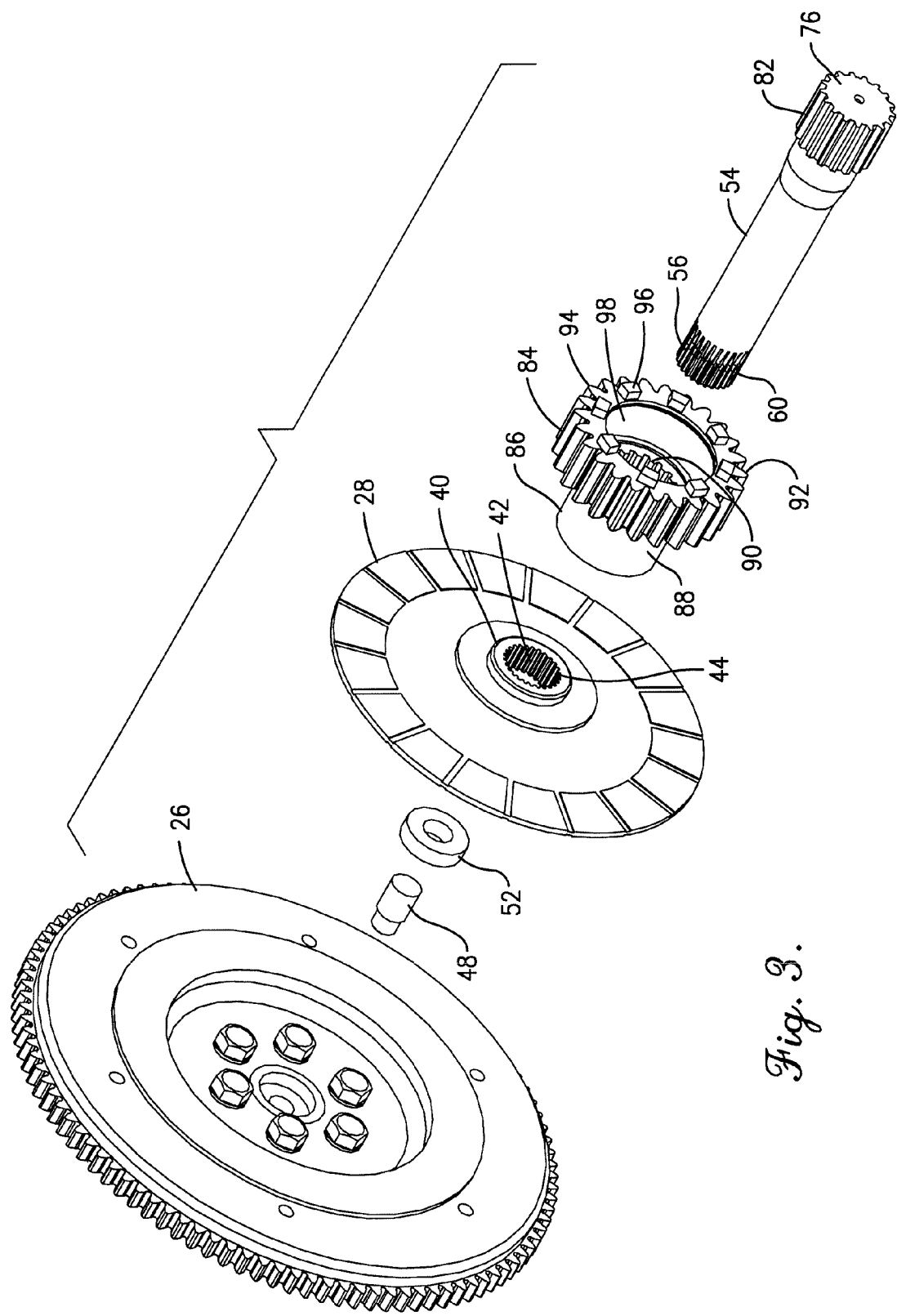
FIG. 3 is an exploded perspective view of the clutch assembly of FIG. 2 with the clutch actuation lever, throwout bearing and some of the gears of the gearbox removed, showing the input shaft of the gearbox aligned for insertion through the input gear of the gearbox for insertion into the internal teeth of the clutch disc.
Figure 4:
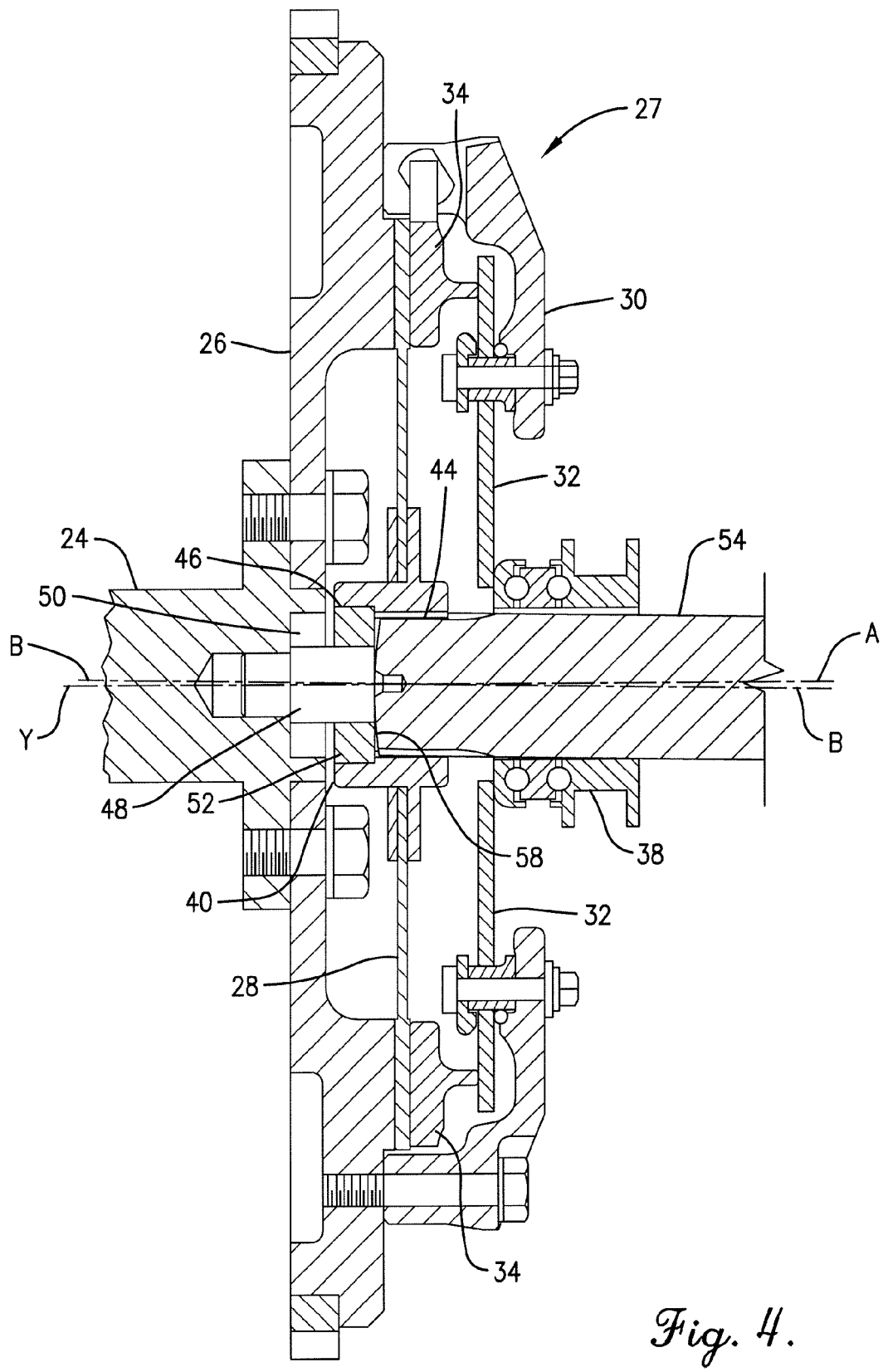
FIG. 4 is a fragmentary vertical cross-sectional view of the input shaft and gearbox to show the axes of rotation of the input shaft and clutch and a bearing for supporting and positioning the input shaft relative to the clutch assembly.

A primary shaft, such as the crankshaft 24 of an internal combustion engine 14, is typically bolted to a flywheel 26, shown for example in FIGS. 2 and 4, on the side of the flywheel 24 opposite the gearbox 16. FIGS. 2, 3 and 4 illustrate a clutch assembly 27 in accordance with the present invention and utilized to operatively couple and decouple the crankshaft 24 from the gearbox 16. A clutch friction disc 28, shown in FIGS. 3 and 4, is positioned adjacent the flywheel 26. A clutch pressure plate 30 is bolted to the flywheel 26 on the opposite side of the crankshaft 24 and includes spring portions 32 which flex and normally bias ring 34 against the friction disc 28 to hold the friction disc against the flywheel 26. When the clutch pedal is depressed to move the clutch lever 36, the throw-out bearing 38 moves against the spring portions 32 which in turn releases the ring 34 from biasing engagement with the friction disc 28 and thereby permits the flywheel 26 to rotate without corresponding driving of the friction disc 28.

The friction disc 28 of the present invention includes a novel clutch disc hub 40 which includes a central passage 42 having internal splines 44 at its rear end and an enlarged annular recess 46 at its forward end oriented toward the crankshaft 24. The central passage 42 receives therein a pilot stub 48 which is complementally sized for receipt in a pocket 50 at the rear end of the crankshaft 24 and also to be received within an annular pilot bearing 52 received in the annular recess 46 of the clutch disc hub 40. An input shaft 54 of the gearbox 16 is received in the rear end of the passage 42 of the clutch disc hub 40, and is provided with forward external splines 56, to be described in greater detail hereinafter, which intercalate with the internal splines 44 of the clutch disc hub 40 in driven engagement. The input shaft includes a rounded, slightly domed front surface 58 which facilitates the ability of the input shaft 54 to rock and tilt relative to the pilot stub 48.

Thus, in contrast to conventional input shafts which have a pilot machined as a part thereof for locating the input shaft on the crankshaft, the provision of a separate pilot stub 48 permits the input shaft 54 of the present invention to be located by the forward external splines 56 and the clutch disc hub 40. The clutch disc hub 40 may be held to the surrounding portions of the friction disc 28 by welding, rivets, or in any other conventional manner, or could be provided with external splines whereby the hub 40 is a separate component from the remainder of the friction disc 28.

The benefit if locating input shaft 54 on the clutch disc hub 40 rather than the crankshaft 24 is realized in the provision of forward external splines 56 in accordance with the present invention. The forward external splines 56 hereof are involute cut splines which help to self-locate the splines 56 with respect to the internal splines 44, and also are crowned as shown in FIG. 7 as crown involute splines 60, so that with respect to the length L of the splines, the radially outer edge center portion 62 has both a greater height and a greater thickness than either the radially outer edge first end 64 or radially outer edge second end 66 of the splines 56. Further, the splines 56 are cut having a root 68 at the base of the splines which is also crowned, such that the center portion 70 of the root 68 is farther from the axis B than at either one end 72 or other end 74 of the root 68. By cutting the splines 56 as crown involute splines 60, the input shaft is able to rock or tilt with respect to the clutch disc hub 40. That is to say, the clutch disc hub 40 is located by the crankshaft 24. The clutch disc hub 40 may have its axis of rotation A slightly offset relative to the axis of rotation Y of the crankshaft 24 without consuming significant energy because the pilot stub merely locates, and does not drive the clutch disc hub. While ideally, axes A and Y will be coincident, as shown in FIG. 4, in fact there will likely always be some variation or offset. On the other hand, the provision of crown involute splines 60 as forward external splines 56 and the fact that the pilot stub 48 is separate from the input shaft means that the input shaft 54 need not locate from the crankshaft at its forward end but rather is located by the clutch disc hub 40. This is inherently a shorter dimension, and further, because the splines 56 are at the forward end of the input shaft 54 and are able to rock or tilt, the axis of rotation B of the input shaft need not be coincident with the axis of rotation A to avoid bending the shaft 54. The crown involute splines of the forward external splines 56 transmit rotational force (roll) without transmitting pitch or yaw on the other two orthogonal axes, and may permit deflections up to about 1° of deflection between the two axes without noticeable loss of power transmission. The axis if rotation B may be offset, or intersect with either or both of the axes of rotation A and Y, without substantial wear or loss of transmitted power due to the necessity of bending the input shaft 54. Moreover, the input shaft 54 is free to translate to a limited degree relative to the clutch disc hub 40 and thus the crankshaft 24 to further allow for movement of the drivetrain components or initial misalignment.

The internal splines 44 have a root and a spline edge including one end, another end, and a longitudinal length extending therebetween, with a middle portion intermediate the ends. The middle portion of the root and the spline edge may be cut whereby they are farther from the axis of rotation A of the clutch disc hub 40 than at either of the ends. It should be understood that in regard to the foregoing, the present invention contemplates that the internal splines 44 could be crown involute splines while the forward external splines 56 could be straight splines and still achieve the deflection compensation benefit. While this would be considered substantially equivalent in reversing which of the two components has the crown involute splines, machining of the forward external splines 56 as crown involute splines 60 is an easier machining operation than crowning the internal splines.

Figure 5:
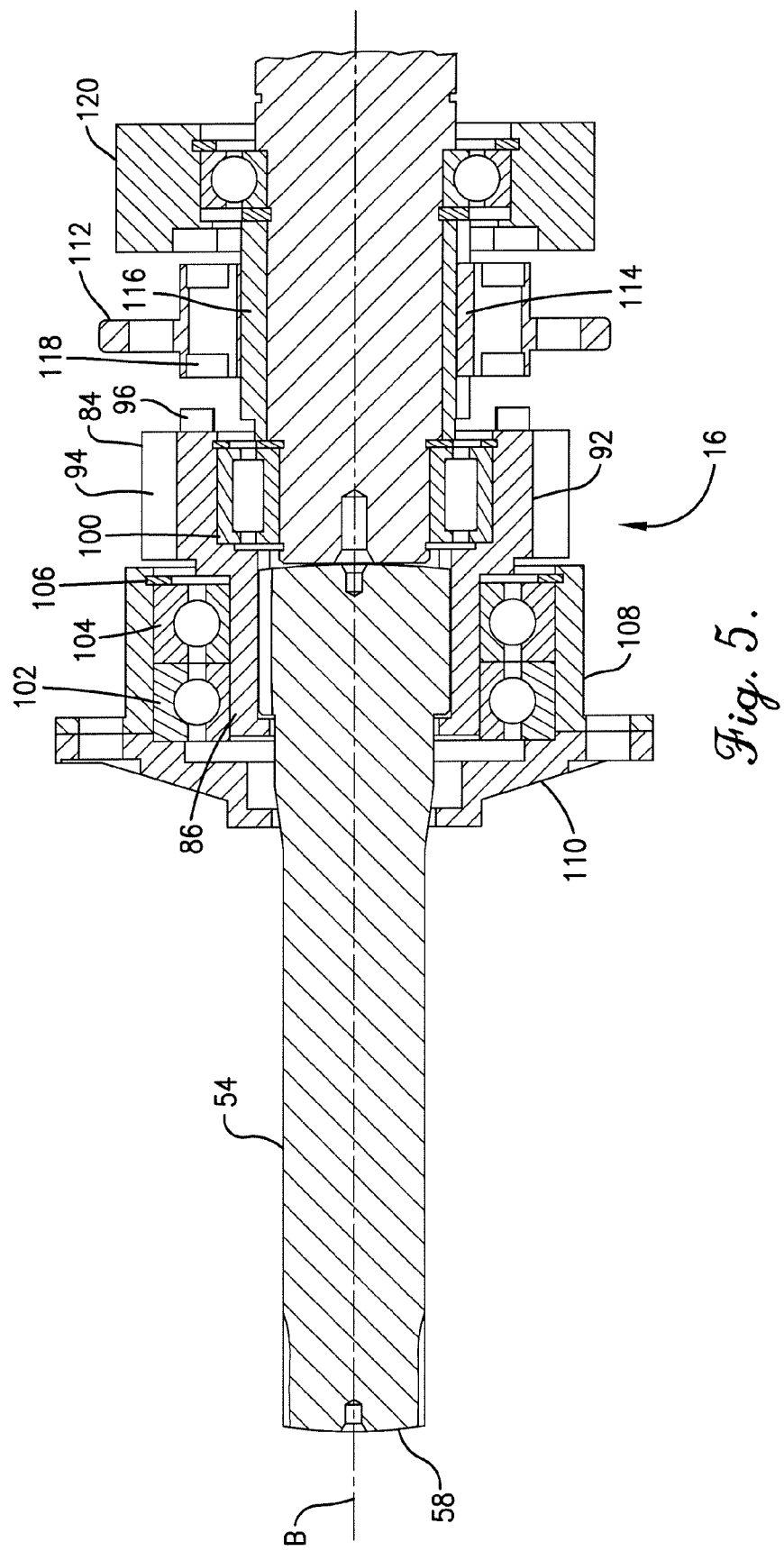
FIG. 5 is a fragmentary vertical cross-sectional view showing the input shaft connected to the input gear of the gearbox.

FIGS. 5 and 6 illustrate the deflection compensation feature of the present invention in an automotive gearbox 16. The gearbox 16 may be a conventional manual gearbox or a gearbox having reduced energy consumption as shown, for example, in my U.S. Pat. No. 5,381,703 and my pending patent application Ser. No. 10/262,350, the disclosures of which are incorporated herein by reference, or with an automatic transmission, for example of the type having a fluid coupling and torque converter. The input shaft 54 leads rearwardly from the clutch assembly 27 to the gearbox 16, a portion of which is shown in FIGS. 5 and 6. The input shaft 54 includes a rounded, slightly convex or domed rear surface 76 for compensating for misalignment or permitting rocking or tilting of the input shaft 54 relative to the main shaft 78 of the gearbox 16. The rear end 80 of the input shaft 54 is provided with rear external splines 82 which are also cut as crown involute splines 60 as shown in FIG. 7 and as described above. The rear external splines 82 are located within and drive an input gear 84. As illustrated in FIGS. 2, 3, 5 and 6, the input gear 84 may be provided with a forward collar portion 86 having a smooth outer bearing surface 88 and internal input gear splines 90, and a rear driving portion 92 including radially outwardly projecting driving teeth 94 and rearwardly extending driving dogs 96 and a smooth internal bearing surface 98 for receiving therein bearing 100. While the internal input gear splines 90 may be cut as crown volute splines 60, it is generally an easier machining operation to cut external splines as crown involute splines than to cut internal splines as crown involute splines. Thus, if the rear external splines 82 are provided as crown involute splines 60, internal input gear splines 90 may be cut as straight splines. The input gear 84 is located by bearings 102 and 104 shown as having ball bearings and raceways, and held by snap ring 106 so that they remain between the input gear 84 and a case bearing 108. The case bearing 108 is, in turn, bolted (bolts not shown in the figures for clarity) through aligned openings in the case bearing to the housing 110 of the gearbox 16. A slider 112 having internal splines 114 may be selectively moved forwardly along radially outwardly extending splines 116 of the main shaft 78 whereby recesses 118 in the slider may receive driving dogs 96. Thus, in a forward position, the driving dogs 96 of the input gear 84 drive the slider 112 which because of the engagement between the splines 114 and 116 in turn causes the main shaft 78 to be driven in direct drive relationship to the input shaft 54. Alternatively, when the slider 112 is moved to a rearward position, the input gear 84 drives a countershaft, which then drives the change speed gear 120. Engagement of dogs on the change speed gear 120 and corresponding recesses on the slider then cause the slider 112 to drive the main shaft 78 corresponding to the rotational speed of the change speed gear 120 because of the interengagement of the splines 114 and 116.

While preferably the input shaft 54, the input gear 84 and the main shaft 78 are all in perfect axial alignment and remain there during operation, as a practical matter this is not the case. For a variety of reasons, including the weight of the components, unevenness of the road surface, high speed turns, and difficulties in obtaining precision alignment during installation, the input gear 84, the main shaft 78 and the input shaft will not initially nor thereafter during operation enjoy coincident axes of rotation. Rather, the axes will be parallel but offset, or intersect, or both offset and non-parallel. In the present invention, the input shaft 54 is, as described above, free to shift and may be offset with respect to the clutch assembly 27 and the crankshaft 24 without noticeable loss of efficiency normally caused when gears bind or the shaft bends. Similarly, the input shaft 54 is not bound by the housing of the gearbox 16. Because of a variety of factors including the crown involute splines 60 of the rear external splines 82, the convex rear surface 76, and the fact that the main shaft 78 and the input shaft 54 are both located by the input gear 84 but the input shaft 54 is free to shift longitudinally and tilt or rock relative to the input gear 84, the input shaft 54 is permitted to be mounted and positioned independently of the gearbox 16 so that initial misalignments or relative movement of the engine, clutch assembly and gearbox does not result in appreciable efficiency losses.

The present invention also provides for deflection compensation of the drivetrain 12 in the axle drive unit 20 of the automobile 10. It may be appreciated that various configurations of drive units are employed for front engine-front wheel drive automobiles, rear engine-rear wheel drive automobiles, mid-engine rear wheel drive automobiles, and four wheel drive automobiles or more. Moreover the axle drive unit 20 may variously be of solid drive, differential, limited slip differential or other arrangements. The present invention may be employed with any of these arrangements, where an axle is used to drive the wheels 22 of the automobile 10. Typically, however, the present invention would not be needed where the axles and the axle drive unit are of the independent suspension type, where the axles are coupled to the axle drive unit by universal joints to permit a wide range of motion.

Figure 8:
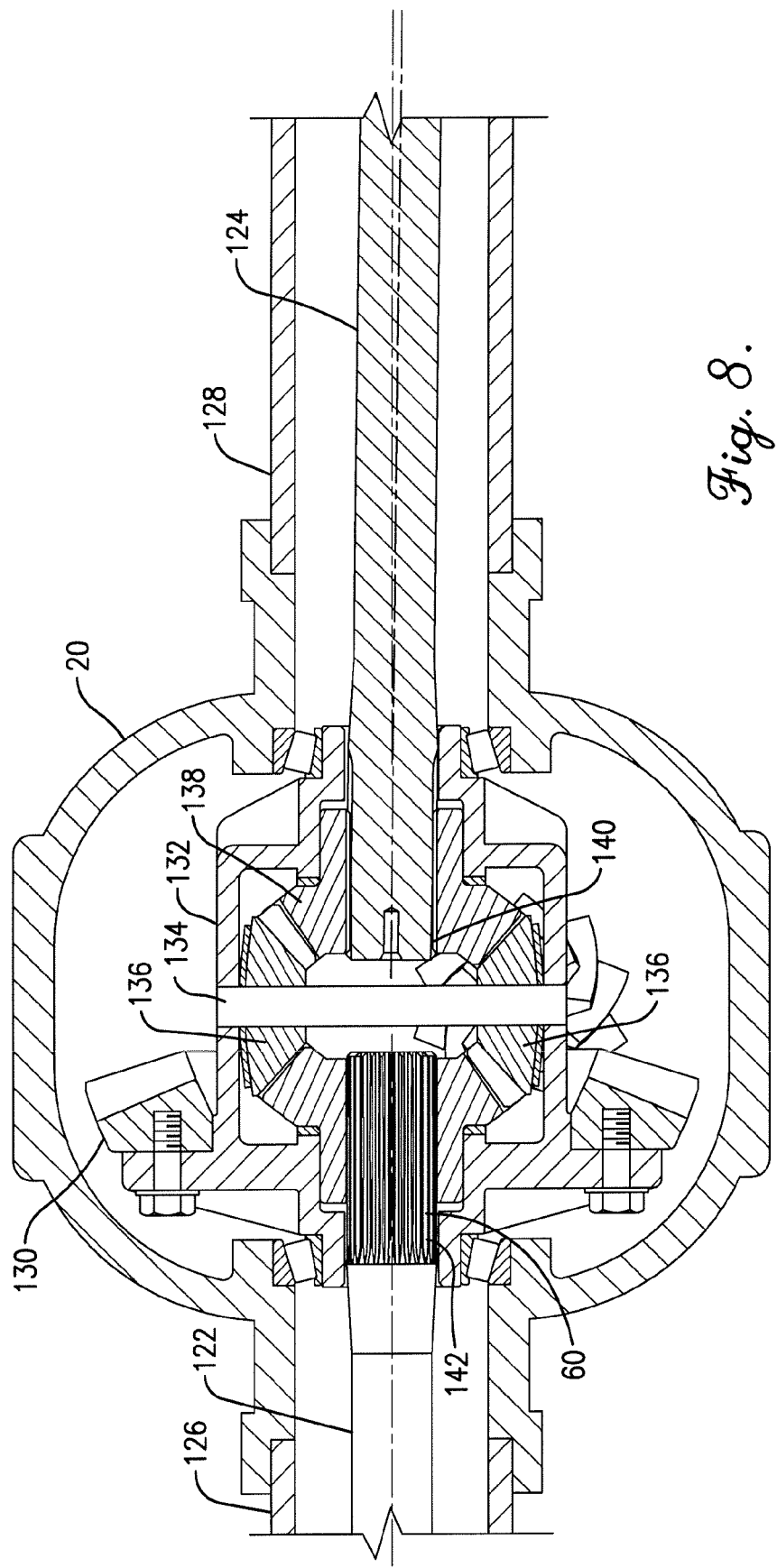
FIG. 8 is a fragmentary vertical cross-sectional view of an axle drive assembly in accordance with the present invention wherein the axle is provided with deflection compensation to permit deflection relative to the bevel gear and crown gear of the axle drive.

FIGS. 1 and 8 illustrate a front engine, rear wheel drive arrangement of the axle drive unit 20 having axles 122 and 124 received in respective axle housings 126 and 128. As illustrated, the axles 122 and 124 are in fact half-axles, each driving one of the wheels 22. The axle drive unit 20 as illustrated is of a differential type whereby the driveshaft 18 drives a bevel pinion (not shown) which in turn rotatably drives a pair of opposed crown wheels, one of which is shown as crown wheel 130. The crown wheels are fixedly coupled to a box 132 which includes pinion shaft 134 which rotates therewith, in turn rotating differential pinions 136 which drive bevel wheels 138. In the present invention, each of the bevel wheels 138 is provided with internal splines 140 for rotatably driving the axles 122 and 124. The axles 122 and 124 are in turn provided with complemental drive unit splines 142 for coupling with internal splines 140 of the drive bevel wheels 138. The drive unit splines 142 are external splines. One of the drive unit splines 142 and the internal splines 140 are made as crown involute splines 60 as shown in FIG. 7, preferably the drive unit splines 142. As a result, the axles 122 and 124 are not required to bend when the axles 122 and 124 are installed in offset relationship such that their respective axes of rotation R are offset relative to the axis of rotation Z of the bevel wheels 138 as shown in FIG. 8. Moreover, the splines 140 and 142 do not bind when the axles 122 and 124 are initially installed or move out of axial alignment with the bevel wheels 138 because one of the splines 140 and 142 are crown involute splines, allowing limited movement therebetween both axially and angularly.

The present invention presents distinct advantages in regard to the ability to locate the driven components independently, thus permitting relative movement and angular relationships. Thus, the input shaft can be located independently of the mainshaft of the gearbox, as well as the crankshaft and flywheel, and it is not necessary that the input shaft remain in alignment nor held against axial movement relative to the mainshaft. Further, the present invention provides deflection compensation for relative differences in axial alignment of the clutch assembly, the main shaft, and the input shaft. Further, the axles and axle drive unit may have their respective axes offset relative to one another to thereby reduce or minimize energy losses which would otherwise result when the axles were required to bend, or excessive wear in the splines.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. In an automotive drivetrain, the improvement comprising:
    a rotatable crankshaft;
    a clutch hub drivable by said crankshaft;
    a pilot stub projecting from one end of said hub into a pocket in said crankshaft; and
    a gearbox input shaft separate from said pilot stub and projecting from an opposite end of said hub,
    said hub being drivingly coupled with said gearbox input shaft for rotating the input shaft when the hub is rotated by said crankshaft.

2. In an automotive drivetrain as claimed in claim 1, said hub and said input shaft being drivingly coupled to one another using crown involute splines whereby to permit limited tilting of the input shaft relative to the pilot stub.

3. In an automotive drivetrain as claimed in claim 2, said crown involute splines comprising internal splines on said input shaft, said hub having straight internal splines intercalated with the external splines on the input shaft.

4. In an automotive drivetrain as claimed in claim 3, said input shaft having a domed end surface in abutting engagement with one end of said pilot stub.

5. In an automotive drivetrain as claimed in claim 4, said one end of the hub having an annular bearing that rotatably receives said pilot stub.

6. In an automotive drivetrain as claimed in claim 1, said one end of the hub having an annular bearing that rotatably receives said pilot stub.

7. In an automotive drivetrain as claimed in claim 1, said input shaft having a domed end surface in abutting engagement with one end of said pilot stub.

* * * * *